United States Patent [19]
Hayashi

[11] Patent Number: 5,606,540
[45] Date of Patent: Feb. 25, 1997

[54] DIGITAL SIGNAL REPRODUCING APPARATUS

[75] Inventor: Hideki Hayashi, Tsurugashima, Japan

[73] Assignee: Pioneer Electronic Corporation, Tokyo, Japan

[21] Appl. No.: 581,335

[22] Filed: Dec. 29, 1995

[30] Foreign Application Priority Data

Jan. 20, 1995 [JP] Japan .................................. 7-7650

[51] Int. Cl.$^6$ ..................................................... G11B 5/09
[52] U.S. Cl. ................................. 369/59; 369/48; 360/32
[58] Field of Search ................................. 369/47, 48, 49, 369/50, 54, 59, 60, 124; 360/32, 41, 51

[56] References Cited

U.S. PATENT DOCUMENTS 5,056,116  10/1991  Shimada et al. ........................ 360/41 X
5,517,476  5/1996  Hayashi ................................ 369/59

Primary Examiner—Georgia Y. Epps
Assistant Examiner—P. W. Huber
Attorney, Agent, or Firm—Sughrue, Mion, Zinn, Macpeak & Seas

[57] ABSTRACT

A digital signal reproducing apparatus which is capable of suppressing jitter in a reproduced clock signal, even if recording information is highly densely recorded on a recording medium, to provide reproduced digital signals with a low error ratio. A signal read from the recording medium is sampled at the timing of the reproduced clock signal, to produce a sequence of sampled values. The phase of the reproduced clock signal is corrected based on a sampled value derived in an edge section of a recorded signal which occurs when recording signal portions having a run length longer than a predetermined length are consecutively read, among sample value series obtained by sampling the read signal, which is read-out from the recording medium, at the timing of the reproduced clock signal.

10 Claims, 18 Drawing Sheets

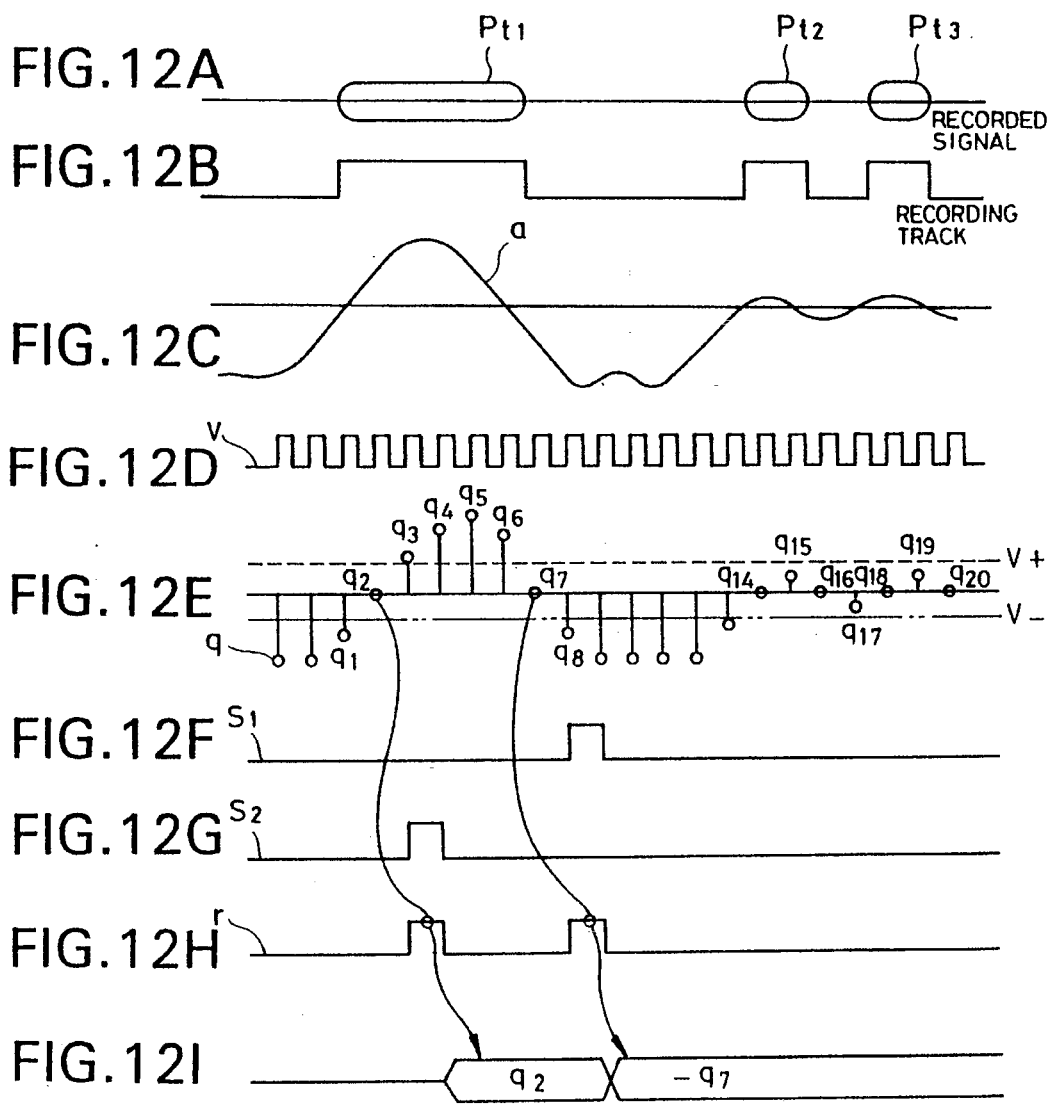

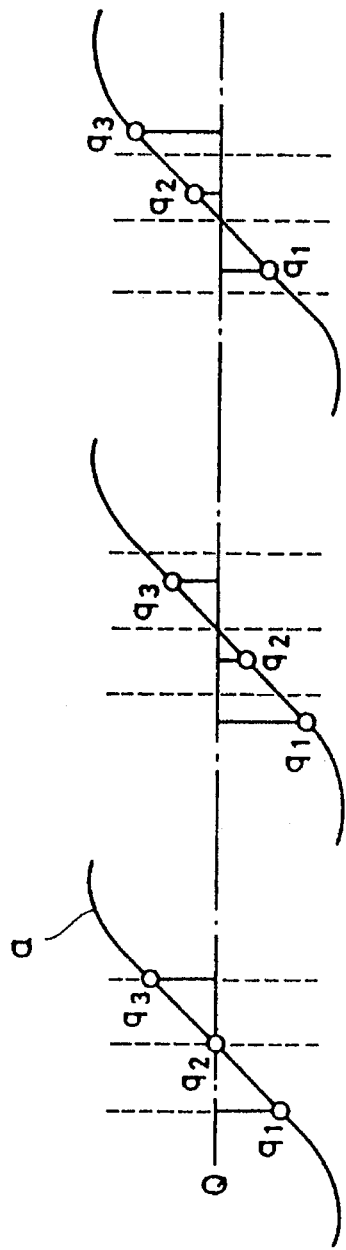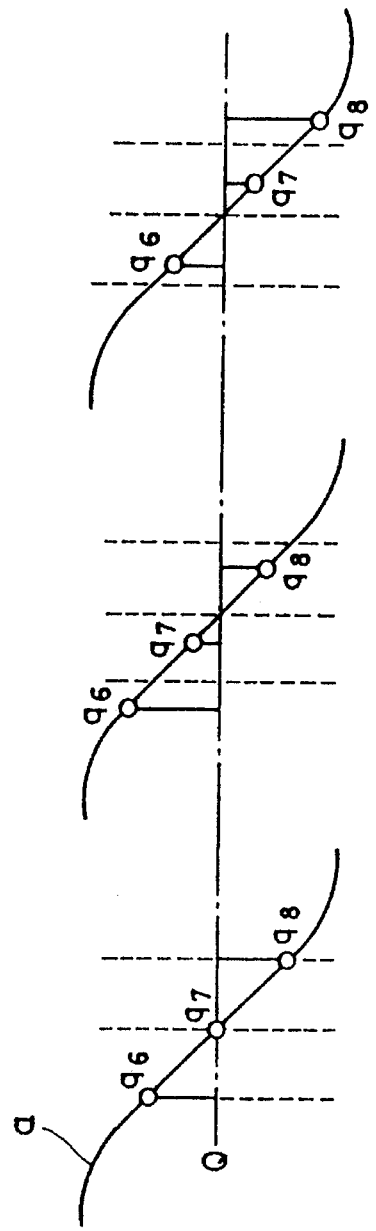

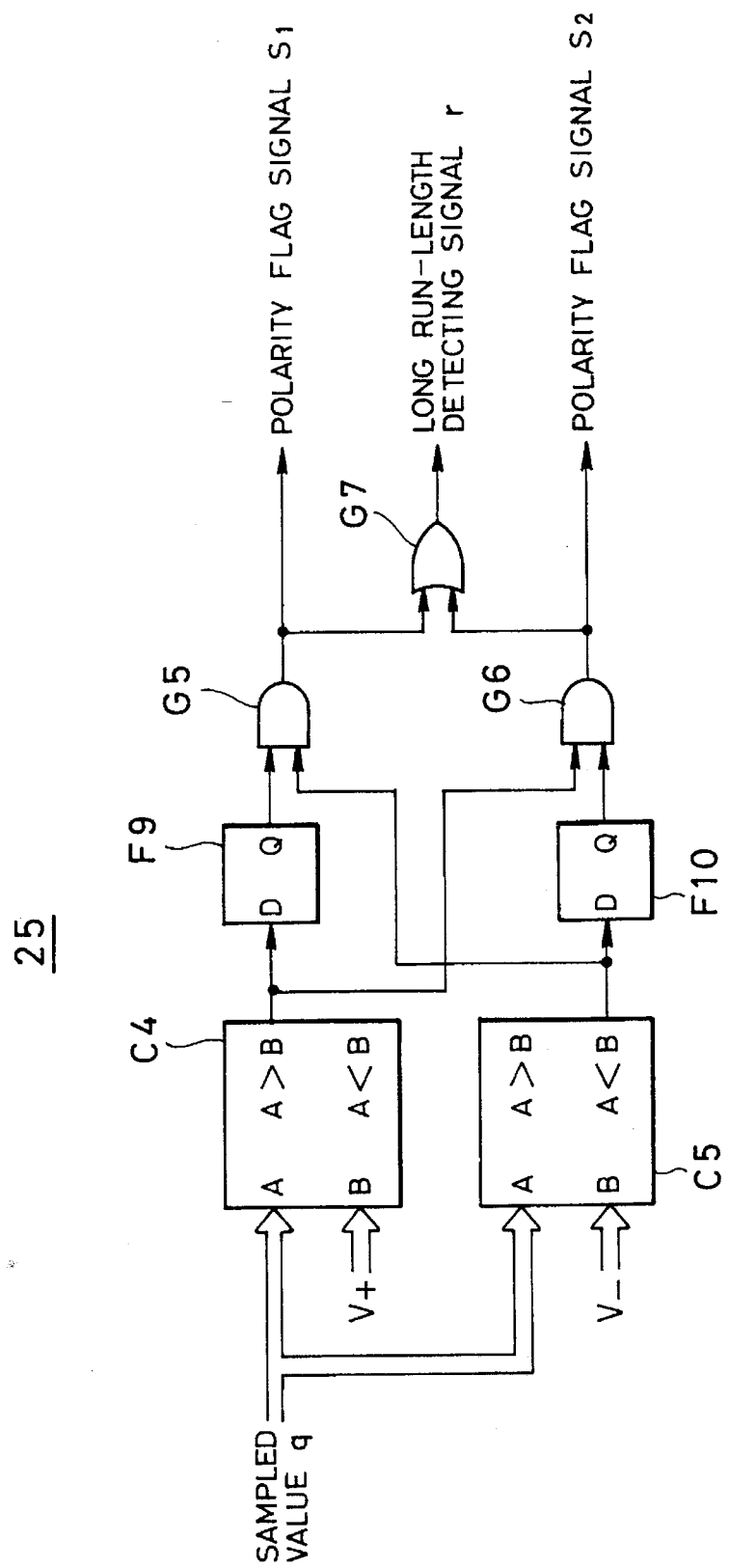

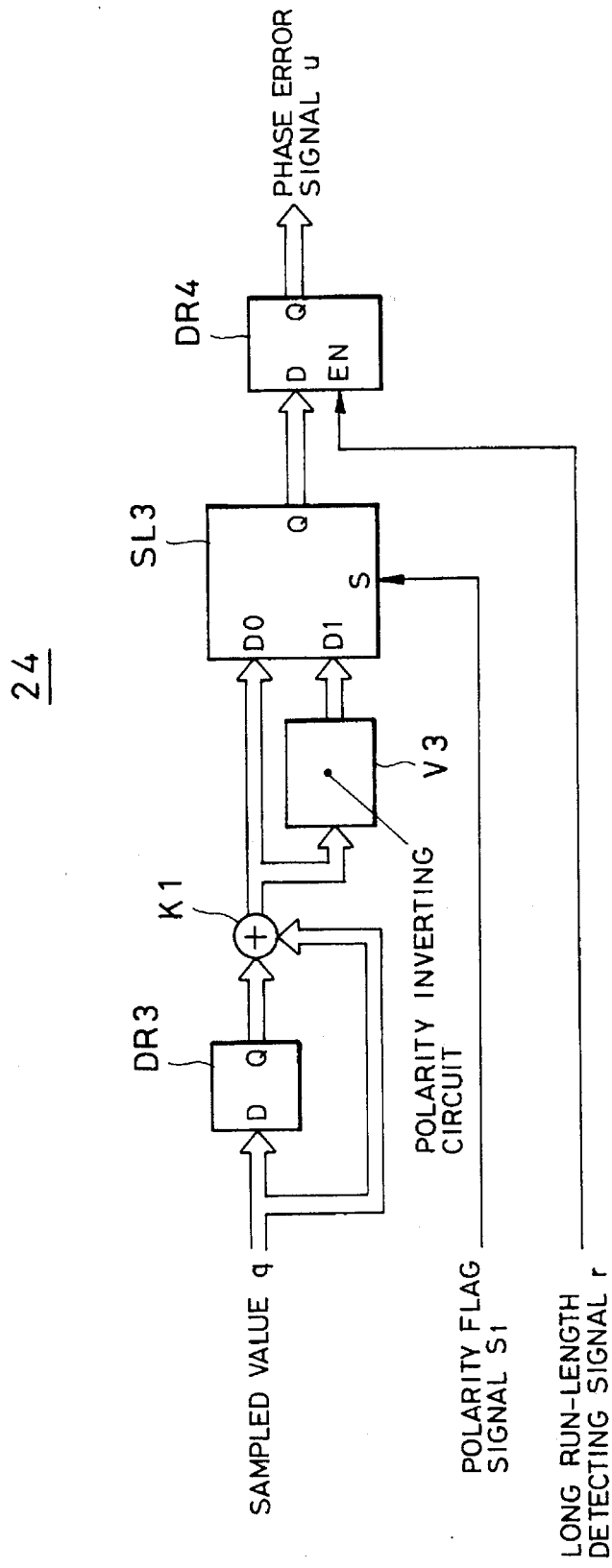

DIGITAL SIGNAL REPRODUCING APPARATUS

BACKGROUND OF THE INVENTION

1. Field of the Invention

The present invention relates to a digital signal reproducing apparatus for reproducing a digital signal recorded on an optical recording medium.

2. Description of Background Information

FIG. 1 schematically shows an exemplary configuration of a prior art digital signal reproducing apparatus, and FIG. 2 shows waveforms representing the operation performed by the circuits in the configuration shown in FIG. 1.

Referring specifically to FIG. 1, an optical pickup 1 irradiates an optical disc 3 as an optical recording medium, rotated by a spindle motor 2, with a laser beam. The optical pickup 1 also opto-electrically transforms reflected light from the optical disc 3 to produce a read signal "a" which is supplied to a comparator 4.

On a recording track on the optical disc 3, a plurality of recording pits Pt corresponding to digitally recorded signals as recording information are formed as shown in FIG. 2. A run length NT of the recording pits Pt is classified into several groups, one of which is employed in accordance with a particular modulation scheme for the digitally recorded signal. For example, if a digitally recorded signal is encoded in accordance with an RLL (1, 7) modulation, recording pits Pt having its run length limited in a range from 2T to 8T are recorded on the recording track.

The optical pickup 1 supplies the comparator 4 with a read signal "a" having a signal level as shown in FIG. 2 in accordance with the reading of the read recording pit Pt formed on the optical disc 3. The comparator 4 compares the signal level of the read signal "a" with the level of a predetermined threshold "b". In this event, the comparator supplies a binary signal c at high level, i.e., "1" to each of a determining circuit 5 and a clock generator circuit 6, when the signal level of the read signal "a" is higher than the level of the predetermined threshold "b", and supplies the binary signal "c" at low level, i.e., "0" to each of the determining circuit 5 and the clock generator circuit 6, when the signal level of the read signal "a" is lower than the level of the predetermined threshold "b".

The clock generator circuit 6 generates a reproduced clock signal "d", the phase of which is synchronized with the edge timing of the binary signal "c". The determining circuit 6 samples the binary signal "c" supplied from the comparator 4 at the timing of the reproduced clock signal "d", and outputs sampled values as a reproduced digital signal "e".

As described above, the digital signal reproducing apparatus shown in FIG. 1 is configured such that a read signal is binary-coded using a predetermined threshold, a reproducec clock signal having the phase synchronized with the edge of the binary signal is generated, and the binary signal is synchronized with the reproduced clock signal to produce a reproduced digital signal.

In this configuration, the higher the density of the recording pits Pt recorded as the digital recording signal, the lower the amplitude level of the read signal, so that the level change of the read signal exhibits a less steep slope. Particularly, the shorter the run length NT of the recording pits PT, the more gradual the slope of the level change of the read signal.

For example, with a recorded signal encoded in conformity with the RLL (1, 7) encoding, a read signal produced in accordance with the recording pit Pt having the shortest run length 2T has an amplitude level lower than the amplitude level of a read signal produced in accordance with the recording pit having the longest run length 8T, as shown in FIG. 3. Also, as indicated by a broken line in FIG. 3 the higher the frequency of a read signal conforming to higher density recording, the lower the amplitude level.

Furthermore, as shown in FIG. 4, a read signal produced in accordance with a recording pit Pt having a run length 2T indicated by a solid line presents a level change of a more gentle slope than a read signal produced in accordance with a recording pit Pt having a run length 8T indicated by a broken line. This is because the amplitude level of the read signal becomes lower as the density of recording increases. This is also because the read signal produced in accordance with the recording pit Pt having the run length 8T has a waveform resembling a square wave owing to harmonic components included therein, whereas the read signal produced in accordance with the recording pit Pt having the run length 2T has a sinusoidal waveform since it does not include harmonic components.

In the digital signal reproducing apparatus as shown in FIG. 1, if the read signal "a" is binary-coded using the predetermined threshold "b", larger jitter are likely to occur in the reproduced clock signal "d" as the read signal a presents a level change of a more gradual slope.

Thus, the prior art digital signal reproducing apparatus as described above has a problem in that since large jitter may occur in the reproduced clock signal "d" generated based on the read signal corresponding to the recorded signal or recording pit having the run length 2T, this causes an increase in an error rate of a digital signal reproduced in synchronism with the reproduced clock signal "d".

OBJECTS AND SUMMARY OF THE INVENTION

The present invention has been made to solve the problem mentioned above, and its object is to provide a digital signal reproducing apparatus which is capable of suppressing jitter in a reproduced clock signal to accomplish a reproduced digital signal with a low error ratio even if recording information is recorded in a high density on an optical disc.

The present invention provides a digital signal reproducing apparatus for reproducing a digital signal based on a read signal read from a recording medium on which signals with limited run lengths are recorded, which comprises an A/D convertor for sequentially sampling the read signal at timing of a reproduced clock signal to convert the read signal to sampled values, decoding means for decoding the reproduced digital signal based on the sampled values, long run length detecting means for detecting an edge section of the recorded signal in a section in which sampled values corresponding to a recorded signal having the run length longer than a predetermined length are successively read, based on the sampled values, phase error generating means for extracting a sampled value derived in the edge section from the sampled values and generating a phase error signal corresponding to the extracted sampled value, and clock generating means for generating a clock signal having a phase which changes based on the phase error signal as the reproduced clock signal.

A signal read from the recording medium is sampled at the timing of the reproduced clock signal to produce a sequence of sampled values. The phase of the reproduced clock signal is corrected based on a sampled value derived in an edge section of a recorded signal which occurs when recording signal portions having a run length longer than a predetermined length are consecutively read, among sample value series obtained by sampling the read signal at the timing of the reproduced clock signal.

BRIEF DESCRIPTION OF THE DRAWINGS

FIG. 12 shows waveforms representing operations performed by the digital signal reproducing apparatus according to the present invention;

FIGS. 13 (a) to 13 (f) are diagrams for explaining phase correction operations for a reproduced clock signal;

FIG. 14 is a block diagram showing another embodiment of an internal configuration of the long run length detector circuit 25;

FIG. 15 is a block diagram showing another embodiment of an internal configuration of the phase error generator circuit 24;

DESCRIPTION OF THE PREFERRED EMBODIMENTS

An embodiment of the present invention will hereinafter be described with reference to the accompanying drawings.

Figure 1:
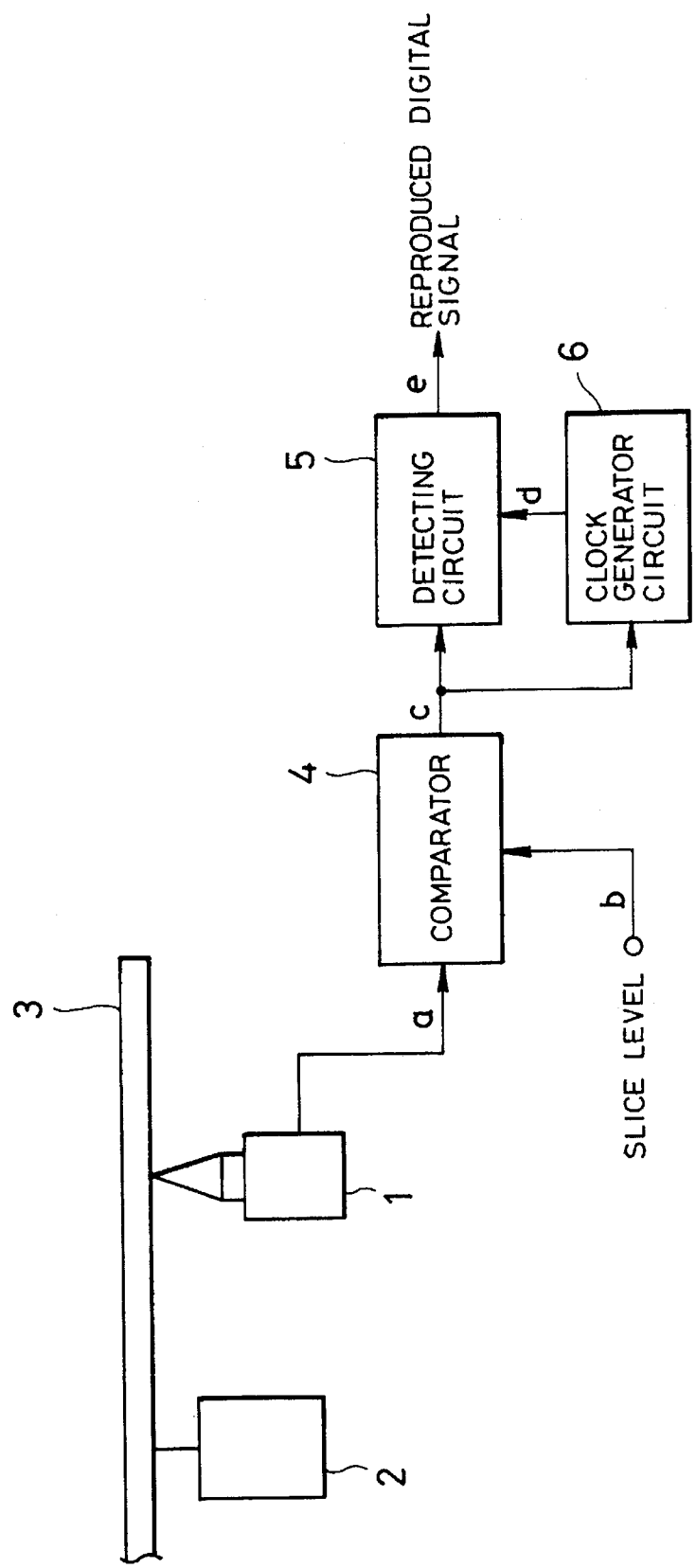
FIG. 1 is a block diagram schematically showing the configuration of a prior art digital signal reproducing apparatus.
Figure 2:
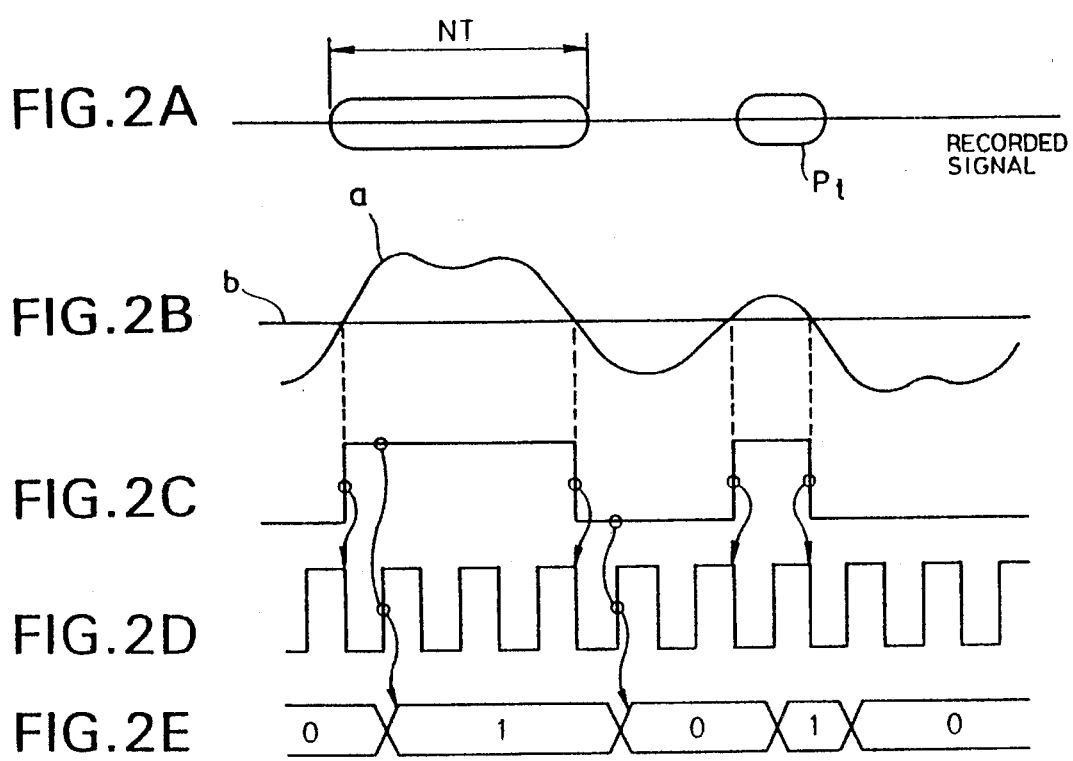
FIG. 2 shows waveforms representing operations performed in the prior art digital signal reproducing apparatus.
Figure 3:
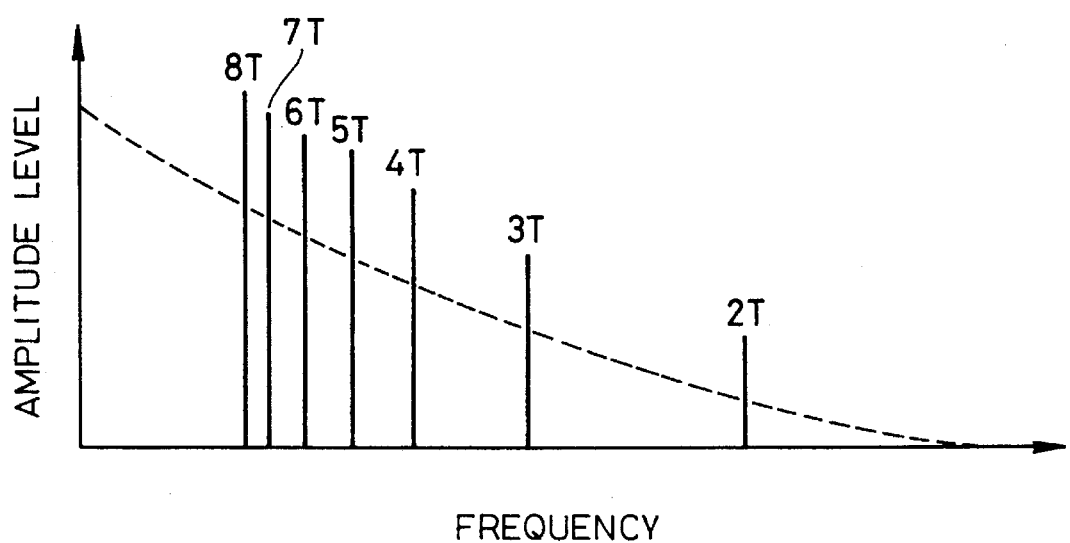
FIGS. 3 and 4 are graphs showing the correspondence relationship between the run length and the amplitude level of a read signal.
Figure 4:
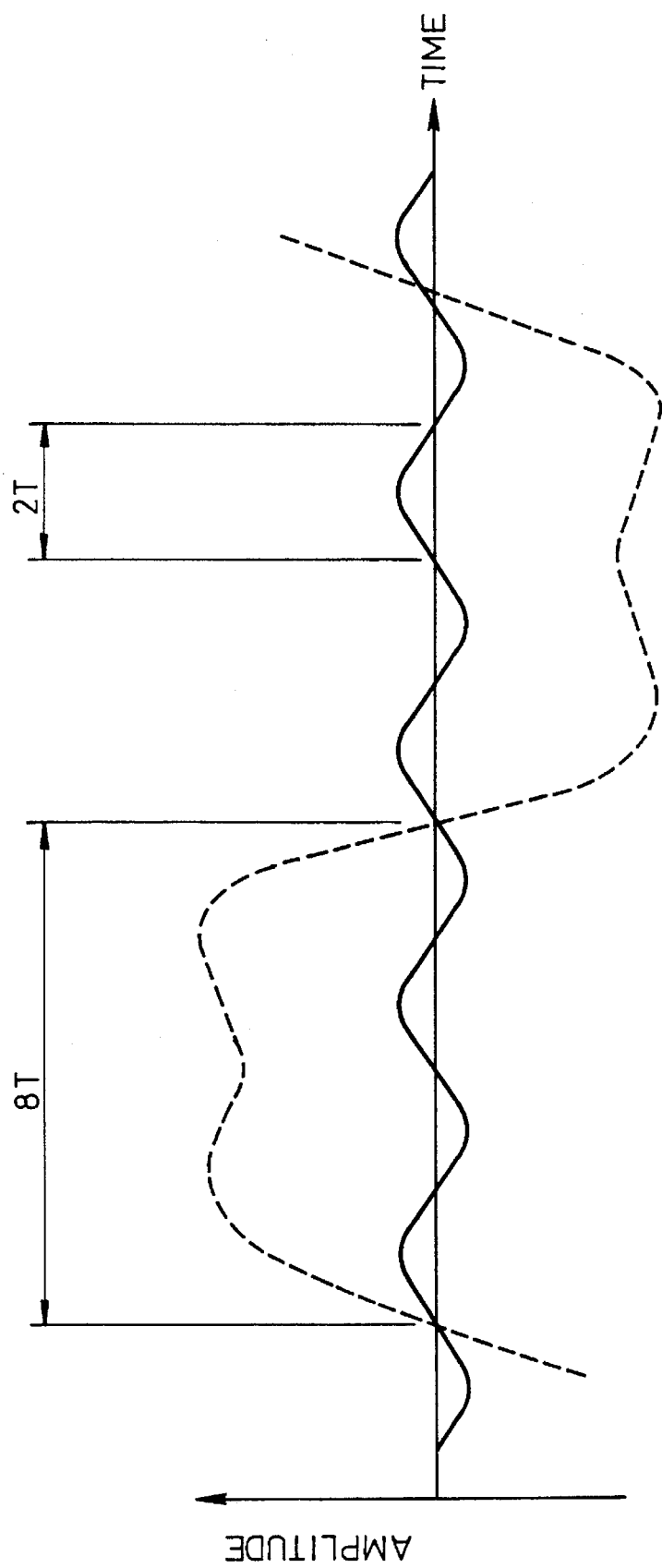
Figure 5:
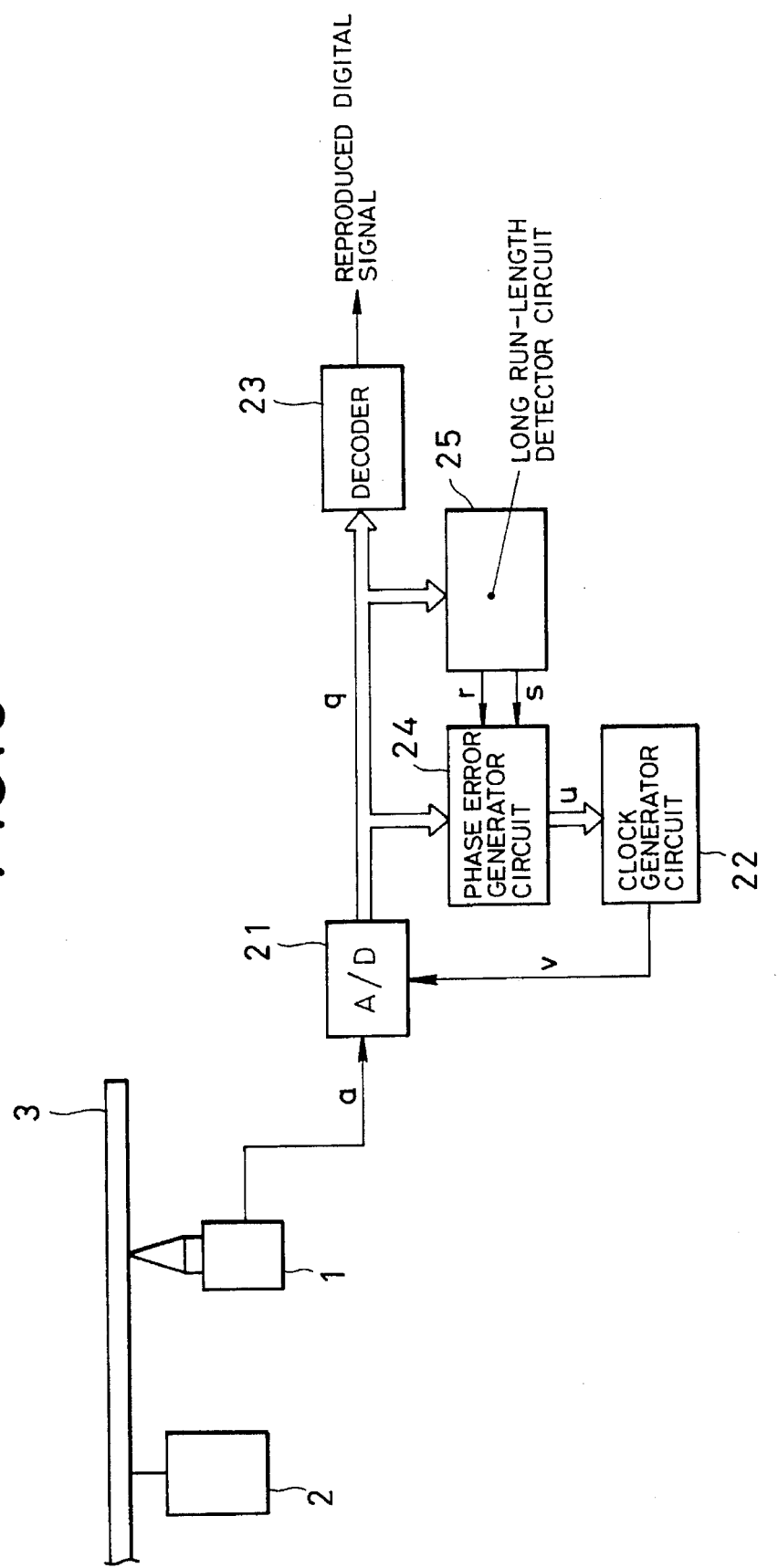
FIG. 5 is a block diagram showing the configuration of a digital signal reproducing apparatus according to the present invention.

FIG. 5 shows a configuration of a digital signal reproducing apparatus according to an embodiment of the present invention.

Referring specifically to FIG. 5, an optical pickup 1 irradiates an optical disc 3 as an optical recording medium, rotated by a spindle motor 2, with a laser beam. The optical pickup 1 also opto-electrically transforms reflected light from the optical disc 3 to produce a read signal a which is supplied to an A/D convertor 21. It is assumed herein that recording pits corresponding to recorded signals having a limited run length are recorded on the optical disc 3.

The A/D convertor 21 samples the read signal a at timing of a reproduced clock signal "v" supplied from a clock signal generator circuit 22 to produce sampled values "q" which are supplied to each of a decoder 23, a phase error generator circuit 24, and a long run length detector circuit 25. The decoder 23, formed of a Viterbi decoder, by way of example, captures the sampled values "q" sequentially supplied thereto from the A/D convertor 21 as a time sequence of successive sampled values, and decodes the sampled values to a reproduced digital signal comprising binary values "1" and "0".

The long run length detector circuit 25 detects a section in which recording signal portions having a run length longer than a predetermined length are successively read, based on the sampled values "q" sequentially supplied thereto from the A/D convertor 21, and generates a long run length detecting signal "r" indicative of an edge section in which the recording signal changes its polarity in the detected section. The long run length detecting signal "r" is supplied to the phase error generator circuit 24. The predetermined length may be determined, for example, when the recorded signal is encoded in conformity with the RLL (1, 7) modulation and has its run length limited in a range from 2T to 8T, to be the shortest run length 2T.

The long run length detector circuit 25 also supplies the phase error generator circuit 24 with a polarity flag signal "s" indicative of the polarity of a level change of the sampled values "q" during the detection of the long run length. In other words, the polarity flag signal "s" indicates whether the level change of the sampled values "q" presents an increasing tendency or a decreasing tendency.

The phase error generator circuit 24 extracts only a sampled value falling under the edge section indicated by the long run length detecting signal "r", from the sampled values "q" sequentially supplied thereto from the A/D convertor 21. In this event, the phase error detector circuit 24 supplies the clock generator circuit 22 with the sampled value extracted in the foregoing manner as a phase error signal "u" when it is supplied with the polarity flag signal "s" indicating that a level change of the sampled values "q" corresponding to the detected long run length presents an increasing tendency. On the other hand, the phase error detector circuit 24 inverts the polarity of the sampled value extracted in the foregoing manner and supplies the clock generator circuit 22 with the inverted sampled value as the phase error signal "u" when it is supplied with the polarity flag signal "s" indicating a decreasing tendency.

In other words, the phase error generator circuit 24 extracts a sampled value falling under an edge section, at which a sampled value sequence changes the polarity, from a sequence of sampled values derived during a long run length detecting section detected by the long run length detector circuit. Then, the phase error generator circuit 24 generates the phase error signal "u" in accordance with the extracted sampled value.

The clock generator circuit 22 generates a clock signal having a phase in accordance with the phase error signal "u", which is supplied to the A/D convertor 21 as a reproduced clock signal "v".

Figure 6:
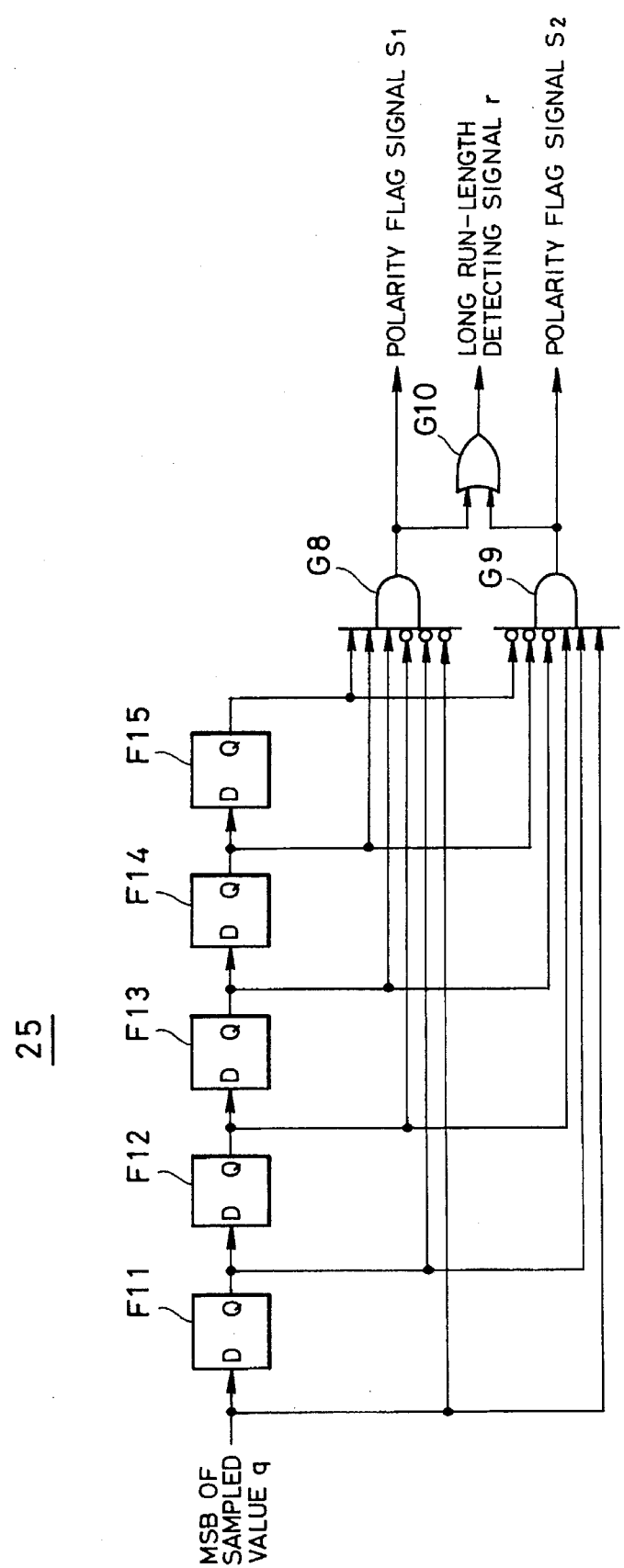
FIG. 6 is a schematic circuit diagram showing an example of an internal configuration of a long run length detector circuit 25.

FIG. 6 shows an example of an internal configuration of the long run length detector circuit 25.

Referring specifically to FIG. 6, the most significant bit of each of the sampled values "q" sequentially supplied from the A/D convertor 21 is sequentially supplied to D-type flip-flops F11–F15 constituting a shift register. This shift register shifts the most significant bits of the sampled values "q" sequentially in the order of F11, F12, F13, F14, and F15 at the same timing as the reproduced clock signal "v". An AND gate G8 outputs a polarity flag signal s1 at logical "1" only when the most significant bit of a current sampled value "q" and output values of the D-type flip-flops are "0, 0, 0, 1, 1, 1". An AND gate G9 outputs a polarity flag signal s2 at logical "1" only when the most significant bit of the current sampled value "q" and the output values of the D-type flip-flops are "1, 1, 1, 0, 0, 0". An OR gate G10 outputs the long run length detecting signal "r" at logical "1" when either the polarity flag signal s1 or the polarity flag signal s2 is at logical "1".

In other words, the long run length detector circuit 25 detects that a sequence of the most significant bits of the sampled values "q" sequentially supplied thereto from the A/D convertor 21 is "0, 0, 0, 1, 1, 1" or "1, 1, 1, 0, 0, 0" to determine that sampled values corresponding to a recording pit having a run length longer than 3T have been successively read, and responsively outputs the long run length detecting signal "r" at logical "1".

Figure 7:
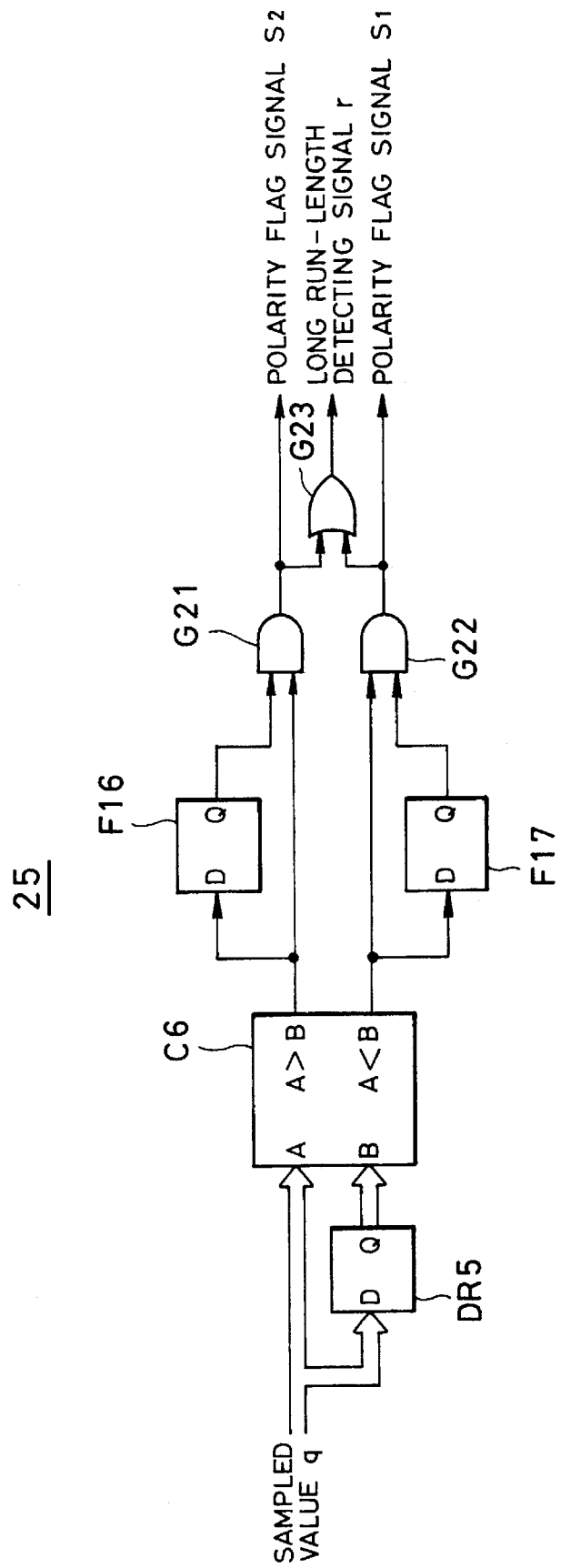
FIGS. 7 to 9 are schematic circuit diagrams each showing a different embodiment of an internal configuration of the long run length detector circuit 25.

Alternatively, as the configuration for detecting the long run length based on a sampled value sequence as described above, a long run length detector circuit 25 having an internal configuration as shown in FIG. 7 may also be employed.

Referring specifically to FIG. 7, a D-type register DR5, having a plurality of D-type flip-flop arranged in parallel, captures sampled values "q" sequentially supplied thereto from the A/D convertor 21 at the same timing as the reproduced clock signal "v", and supplies them to a comparator C6. The comparator C6 compares each of the sampled values "q" sequentially supplied thereto from the A/D convertor 21 with a sampled value supplied from the D-type register DR5, and supplies a logical "1" signal to each of a D-type flip-flop F16 and an AND gate G21 when the sampled value "q" is larger than the sampled value from the D-type register DR5, and supplies a logical "0" signal to each of the D-type flip-flop F16 and the AND gate G21 when the sampled value "q" is smaller than the sampled value from the D-type register DR5. Also, the comparator C6 supplies a logical "0" signal to each of a D-type flip-flop F17 and an AND gate G22 when the sampled value "q" directly supplied thereto from the A/D convertor 21 is larger than the sampled value supplied from the D-type register DR5, and supplies a logical "1" signal to each of the D-type flip-flop F17 and the AND gate G22 when the sampled value "q" is smaller than the sampled value supplied from the D-type register DR5.

The AND gate G21 outputs a polarity flag signal s2 at logical "1" indicating that a level change of the sampled values "q" presents an increasing tendency when the signals supplied from the D-type flip-flop F16 and the comparator C6 are both at logical "1", and outputs the polarity flag signal s2 at logical "0" indicating that a level change of the sampled values "q" presents a decreasing tendency when one of the signals supplied from the D-type flip-flop F16 and the comparator C6 is at logical "0". The AND gate G22 outputs a polarity flag signal s1 at logical "1" indicating that a level change of the sampled values "q" presents a decreasing tendency when the signals supplied from the D-type flip-flop F17 and the comparator C6 are both at logical "1", and outputs the polarity signal s1 at logical "0" indicating that the level change of the sampled values "q" presents an increasing tendency when one of the signals supplied from the D-type flip-flop F17 and the comparator C6 is at logical "0". An OR gate G23 outputs a long run length detecting signal "r" at logical "1" when either the polarity flag signal s1 or the polarity flag signal s2 is at logical "1".

In other words, the long run length detector circuit 25 shown in FIG. 7 detects whether the level change of the sampled values "q" presents an increasing tendency or a decreasing tendency, based on two successive sampled values, to determine whether a current sampled value is larger or smaller than the preceding sampled value.

Figure 8:
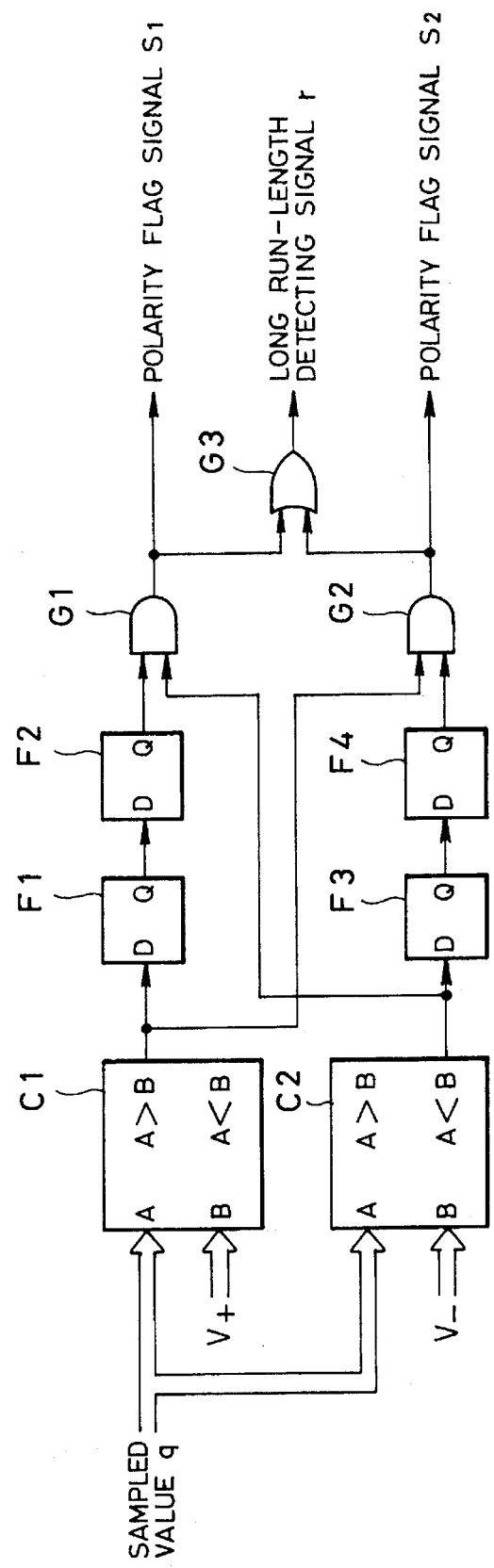

FIG. 8 shows an internal configuration of the long run length detector circuit 25 according to another embodiment.

Referring specifically to FIG. 8, a comparator C1 compares each of sampled values "q" sequentially supplied thereto from the A/D convertor 21 with a positive threshold V+, and supplies a logical "1" signal to each of a D-type flip-flop F1 and an AND gate G2 when the sampled value "q" is larger than the positive threshold V+, while supplies a logical "0" signal to each of the D-type flip-flop F1 and the AND gate G2 when the sampled value "q" is smaller than the positive threshold V+. The D-type flip-flop F1 sequentially captures supplied signals at the same timing as the reproduced clock signal "v" and supplies them to a D-type flip-flop F2. The D-type flip-flop F2 sequentially captures the supplied signals at the same timing as the reproduced clock signal "v", and supplies them to an AND gate G1.

A comparator C2 compares each of the sampled values "q" sequentially supplied thereto from the A/D convertor 21 with a negative threshold V−, and supplies a logical "1" signal to each of a D-type flip-flop F3 and the AND gate G1 when the sampled value "q" is smaller than the negative threshold V−, while supplies a logical "0" signal to the D-type flip-flop F3 and the AND gate G1 when the sampled value "q" is larger than the negative threshold V−. The D-type flip-flop F3 sequentially captures supplied signals at the same timing as the reproduced clock signal "v", and supplies them to the AND gate G2.

The AND gate G1 outputs a polarity flag signal s1 at logical "1" indicating that a level change of the sampled values "q" presents a decreasing tendency when the signals supplied from the D-type flip-flop F2 and the comparator C2 are both at logical "1", and outputs the polarity flag signal s1 at logical "0" when one of the signals supplied from the D-type flip-flop F2 and the comparator C2 is at logical "0". The AND gate G2 outputs a polarity flag signal s2 at logical "1" indicating that a level change of the sampled values "q" presents an increasing tendency when the signals supplied from the D-type flip-flop F4 and the comparator C1 are both at logical "1", and outputs the polarity flag signal s2 at logical "0" when one of the signals supplied from the D-type flip-flop F4 and the comparator C1 is at logical "0". An OR gate G3 outputs a long run length detecting signal "r" at logical "1" when either the polarity flag signal s1 or the polarity flag signal s2 is at logical "1".

Stated another way, the long run length detector circuit 25 as shown in FIG. 8 generates the long run length detecting signal "r" at logical "1" when it detects that three successive sampled values "q" sequentially supplied thereto from the A/D convertor 21 change from a value larger than the positive threshold V+ to a value smaller than the negative threshold V−. Also, the long run length detector circuit 25 generates the long run length detecting signal "r" at logical "1" when it detects that three successive sampled values "q" sequentially supplied thereto from the A/D convertor 21 change from a value smaller than the negative threshold V− to a value larger than the positive threshold V+.

That is, the long run length detector circuit 25 as shown in FIG. 8 relies on the fact that an amplitude value of a read signal a, produced in accordance with the reading of a recorded signal having a long run length, is larger than an amplitude value of a read signal "a" produced in accordance with the reading of a recorded signal having a short run length, and determines a long run length by detecting that the level of the sampled values "q" continuously increases or continuously decreases beyond a predetermined range (from the negative threshold V− to the positive threshold V+) during a time period corresponding to three samples.

It should be noted that while in the foregoing embodiments, FIGS. 6 to 8 have shown examples of the internal configuration of the long run length detector circuit 25, the internal configuration of the long run length detector circuit 25 is not limited to such specific configurations.

Figure 9:
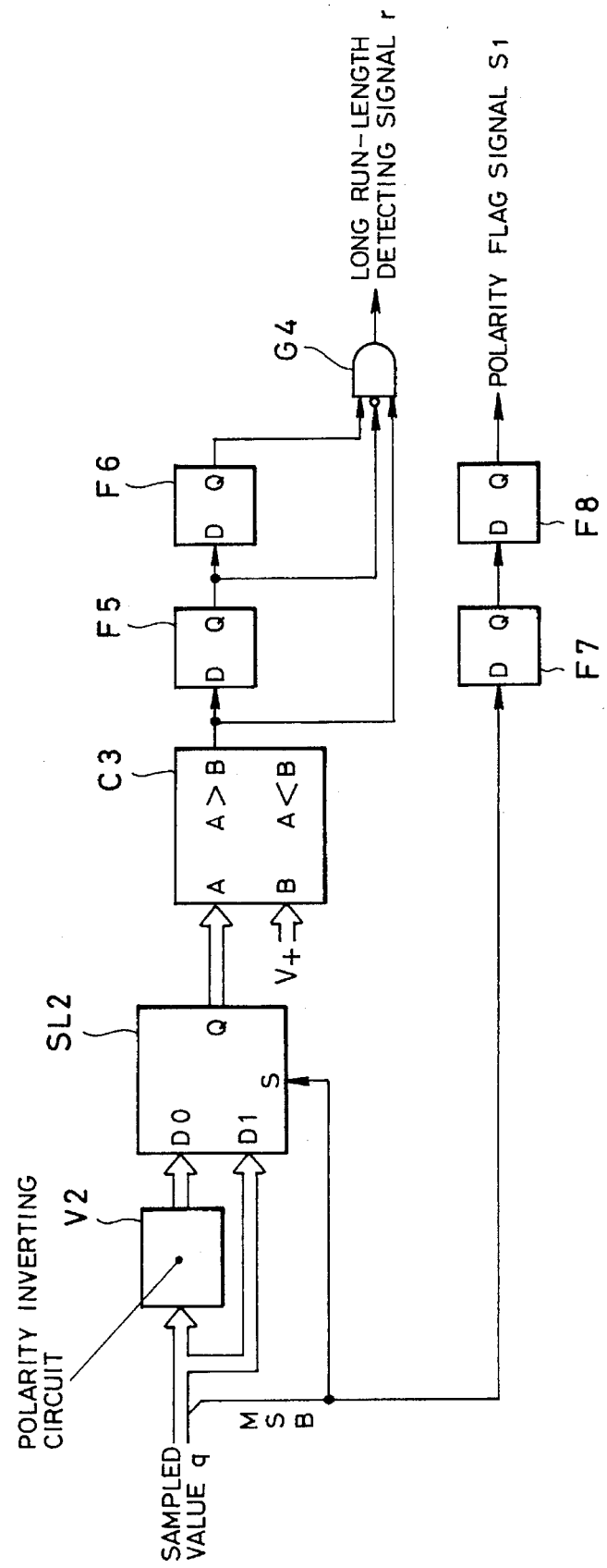

FIG. 9 shows an internal configuration of the long run length detector circuit 25 according to a further embodiment of the present invention.

Referring specifically to FIG. 9, a polarity inverting circuit V2 inverts the polarity of each of sampled values "q" supplied from the A/D convertor 21, and supplies the polarity inverted sampled value to a selector SL2. More specifically, when a sampled value "q" has a positive value, the polarity inverting circuit V2 converts it to a negative value. Conversely, when a sampled value "q" has a negative value, the polarity inverting circuit V2 converts it to a positive value. The selector SL2 selectively supplies a comparator C3 with the polarity-inverted sampled value, derived by inverting the polarity of the sampled value "q" and supplied from the polarity inverting circuit V2, when the most significant bit of the sampled value "q" is at logical "0", and selectively supplies the sampled value "q" to the comparator C3 when the most significant bit of the sampled value "q" is at logical "1".

In other words, the configuration comprising the polarity inverting circuit V2 and the selector SL2 derives an absolute value of the sampled value "q" which is supplied to the comparator C3.

The comparator C3 compares the absolute value of the sampled value "q" supplied from the selector SL2 with a positive threshold V+, and supplies a logical "1" signal to each of a D-type flip-flop F5 and an AND gate G4 when the absolute value of the sampled value "q" is larger than the positive threshold V+, while supplies a logical "0" signal to each of the D-type flip-flop F5 and the AND gate G4 when the absolute value of the sampled value "q" is smaller than the positive threshold V+. The D-type flip-flop F5 sequentially captures the supplied signals at the same timing as the reproduced clock signal "v", and supplies them to each of a D-type flip-flop F6 and an AND gate G4. The D-type flip-flop F6 sequentially captures the supplied signals at the same timing as the reproduced clock signal "v" and supplies them to an AND gate G4. The AND gate G4 outputs a long run length detecting signal "r" at logical "1" only when logical values of the signals supplied thereto from the comparator C3, the D-type flip-flop F5, and the D-type flip-flop F6 are "1, 0, 1". On the other hand, a signal corresponding to the most significant bit of the sampled value "q" is output through a D-type flip-flop F7 and a D-type flip-flop F8 as a polarity flag signal s1.

It will be understood from the foregoing that the long run length detector circuit 25 as shown in FIG. 9 determines a long run length by detecting that an absolute value of a sampled value "q" is larger than the positive threshold V+.

Figure 10:
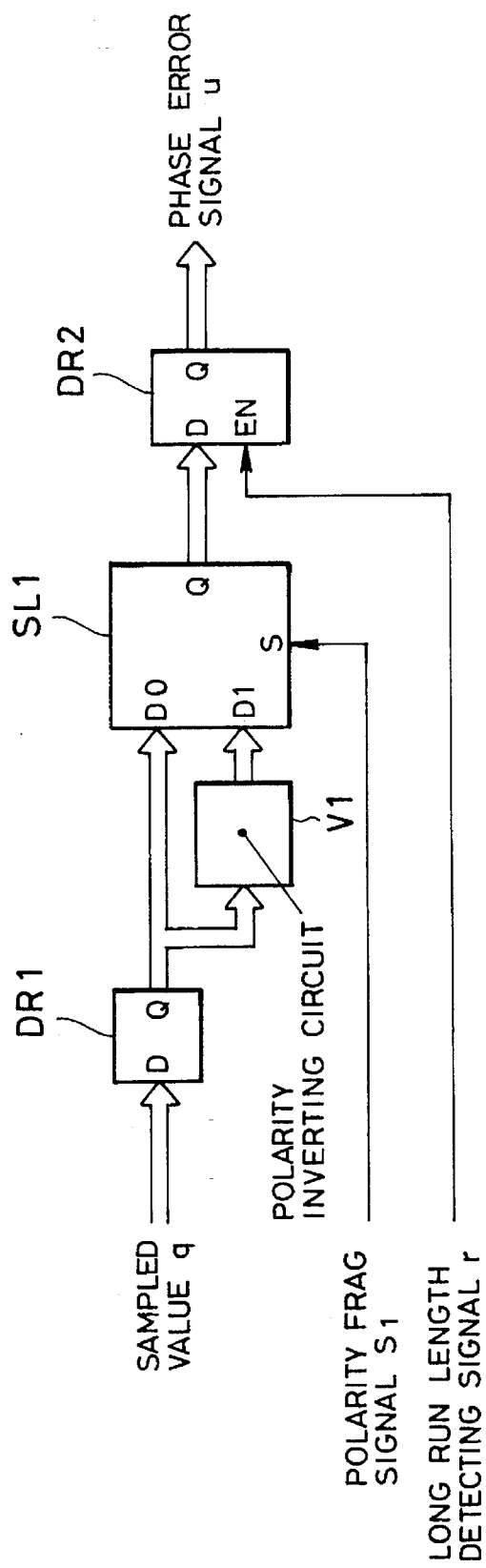
FIG. 10 is a schematic circuit diagram showing an example of an internal configuration of a phase error generator circuit 24.

FIG. 10 shows an example of an internal configuration of the phase error generator circuit 24.

Referring specifically to FIG. 10, a D-type register DR1, having a plurality of D-type flip-flop arranged in parallel, captures sampled values "q" sequentially supplied thereto from the A/D convertor 21 at the same timing as the reproduced clock signal "v", and supplies them to each of a selector SL1 and a polarity inverting circuit V1. The polarity inverting circuit V1 inverts the polarity of each sampled value supplied from the D-type register DR1 and supplies the polarity inverted sampled value to the selector SL1. More specifically, when a sampled value "q" supplied from the D-type register DR1 has a positive value, the polarity inverting circuit V1 converts it to a negative value. Conversely, when a sampled value "q" supplied from the D-type register DR1 has a negative value, the polarity inverting circuit V1 converts it to a positive value. The selector SL1 selectively supplies a D-type register DR2 with the sampled value supplied from the D-type register DR1 when it is supplied with a polarity flag signal s1 at logical "0" from the long run length detector circuit 25, and selectively supplies the D-type register DR2 with the polarity inverted sampled value supplied from the polarity inverting circuit V1 when it is supplied with the polarity flag signal s1 at logical "1" from the long run length detector circuit 25. The D-type register DR2, having a plurality of D-type flip-flop arranged in parallel, captures a sampled value supplied from the selector SL1 and outputs same as a phase error signal "u" only when it is supplied with the long run length detecting signal "r" at logical "1" from the long run length detector circuit 25.

Figure 11:
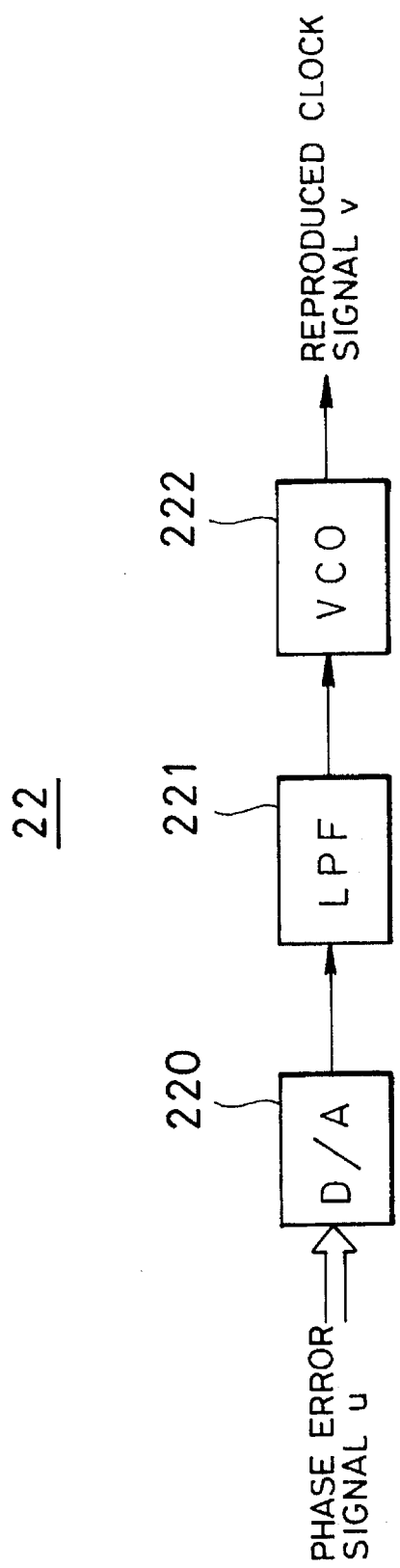
FIG. 11 is a block diagram showing an example of an internal configuration of a clock generator circuit 21.
Figure 16A:
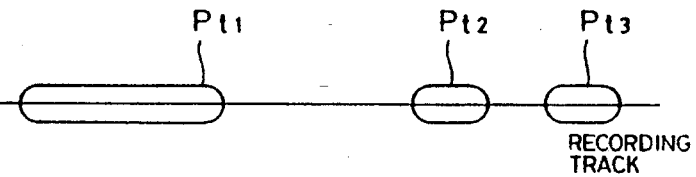
FIG. 16 shows waveform charts representing operations performed by a digital signal reproducing apparatus according to another embodiment of the present invention.
Figure 16B:
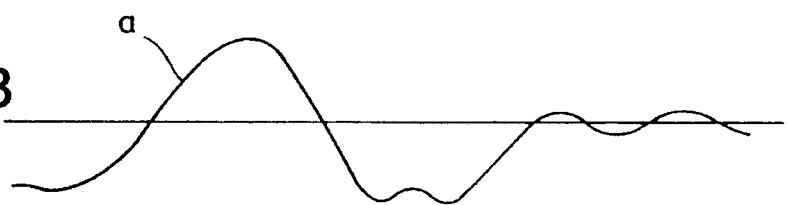
Figure 16C:
Figure 16D:
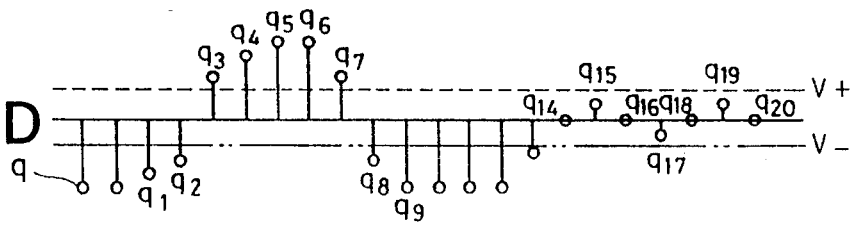
Figure 16E:
Figure 16F:
Figure 16G:
Figure 16H:
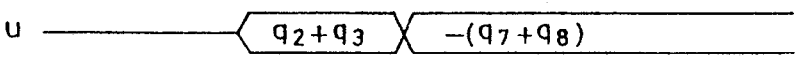

FIG. 11 shows an example of an internal configuration of the clock generator circuit 22. Referring specifically to FIG. 11, a D/A convertor 220 converts the phase error signal "u" supplied from the phase error generator circuit 24 to an analog voltage which is supplied to a low pass filter (LPF) 221. The LPF 221 averages supplied analog voltages, and supplies the average value to a voltage controlled oscillator (VCO) 222. The VCO 222 generates and outputs a reproduced clock signal "v" having an oscillating frequency corresponding to the average analog voltage supplied from the LPF 221. With this configuration, the clock generator circuit 22 outputs the reproduced clock signal "v" having a phase corresponding to the phase error signal "u".

FIG. 12 shows, by way of example, waveforms representing operations performed in the digital signal reproducing apparatus shown in FIGS. 5–11.

In the exemplary operations represented by FIG. 12, the waveforms are produced when the optical pickup 1 in FIG. 5 sequentially traces a recording pit Pt1 corresponding to a recorded signal having a long run length and recording pits Pt2, Pt3 each having a short run length, which are formed on a recording track of the optical disc 3.

As shown in FIG. 12, sequences of sampled values q1 to q3 and q6 to q8 derived by reading the long run length recording pit Pt1 present their level change ranges exceeding a span between a negative threshold V− and a positive threshold V+. On the other hand, a sequence of sampled values q14 to q20 derived by reading the short run length recording pits Pt2 and Pt3 presents a level change range included within the span between the negative threshold V− and the positive threshold V+.

Thus, as shown in FIG. 12, a polarity flag signal s2 at logical "1" and a long run length detecting signal "r" are generated in accordance with the three successive sampled values q1 to q3 presenting an increasing tendency, while a polarity flag signal s1 at logical "1" and the long run length detecting signal "r" are generated in accordance with the three successive sampled values q5 to q8 presenting a decreasing tendency. In this event, the middle sampled value q2 of the sampled values q1 to q3 serves as an error signal "u" in accordance with the first long run length detecting signal "r". Also, in accordance with the next long run length detecting signal "r" and the polarity flag signal s1, the middle sampled value q7 of the sampled values q6 to q8 is inverted, and the inverted sampled value −q7 serves as the error signal "u".

Next, operations associated with a correct of the phase of the reproduced clock signal "v" using the phase error signal "u" will be described with reference to FIG. 13.

FIGS. 13 (a) to (c) show phase correcting operations performed in accordance with the three successive sampled values q1 to q3 presenting an increasing tendency, as illustrated in FIG. 12. FIGS. 13 (d)–(f) show phase correction operations performed in accordance with the three successive sampled values q6–q8 presenting a decreasing tendency as shown in FIG. 12. It should be noted that broken lines in FIG. 13 each indicate the position of timing at which the reproduced clock signal "v" should be generated by the clock generator circuit 22 if the phase is correct. Also, one-dot chain lines each indicate a central level Q of the sampled values.

First, FIG. 13 (a) shows that the sampled values q1, q2, q3 are respectively sampled at correct timing.

In this case, the sampled value q2 has a level equal to the predetermined level Q. Thus, the clock generator circuit 22 is supplied with this predetermined level Q as the phase error signal "u". The clock signal generator circuit 22 responsively generates the reproduced clock signal "v" in a current phase.

Next, FIG. 13 (b) shows that the sampled values q1, q2, q3 are respectively sampled at timing earlier than the correct position.

In this case, the sampled value q2 presents a level lower than the predetermined level Q. This results in supplying the clock generator circuit 22 with a value smaller than the predetermined level Q by the level of the sampled value q2 as the phase error signal "u". In this way, the clock generator circuit 22 delays the phase of the reproduced clock signal "v" by a portion corresponding to the sampled value q2 to correct the advanced phase of the clock.

Next, FIG. 13 (c) shows that the sampled values q1, q2, q3 are respectively sampled at timing later than the correct position.

In this case, the sampled value q2 presents a level higher than the predetermined level Q. This results in supplying the clock generator circuit 22 with a value larger than the predetermined level Q by the level of the sampled value q2 as the phase error signal "u". In this way, the clock generator circuit 22 advances the phase of the reproduced clock signal "v" by a portion corresponding to the sampled value q2 to correct the delayed phase of the clock.

Next, FIG. 13 (d) shows that the sampled values q6, q7, q8 are respectively sampled at correct timing.

In this case, the sampled value q7 has a level equal to the predetermined level Q indicated by the one-dot chain line. Also, a level change of a sequence of the sampled values q6, q7, q8 presents a decreasing tendency. Thus, the clock generator circuit 22 is supplied with this predetermined level Q with the inverted polarity as the phase error signal "u". The clock signal generator circuit 22 responsively generates the reproduced clock signal "v" in a current phase.

Next, FIG. 13 (e) shows that the sampled values q6, q7, q8 are respectively sampled at timing earlier than the correct position.

In this case, the sampled value q7 presents a level higher than the predetermined level Q. Also, a level change of a sequence of the sampled values q6, q7, q8 presents a decreasing tendency. This results in supplying the clock generator circuit 22 with the sampled value q7 with the inverted polarity, i.e., a value smaller than the predetermined level Q by the level of the sampled value q7 as the phase error signal "u". In this way, the clock generator circuit 22 delays the phase of the reproduced clock signal "v" by a portion corresponding to the sampled value q7 to correct the advanced phase of the clock.

Next, FIG. 13 (f) shows that the sampled values q6, q7, q8 are respectively sampled at timing later than the correct position.

In this case, the sampled value q7 presents a level lower than the predetermined level Q. Also, a level change of a sequence of the sampled values q6, q7, q8 presents an increasing tendency. This results in supplying the clock generator circuit 22 with the sampled value q7 with the inverted polarity, i.e., a value larger than the predetermined level Q by the level of the sampled value q7 as the phase error signal "u". In this way, the clock generator circuit 22 advances the phase of the reproduced clock signal "v" by a portion corresponding to the sampled value q7 to correct the delayed phase of the clock.

As described above, the digital signal reproducing apparatus of the present invention is configured to correct the phase of the reproduced clock signal based on a sampled value falling under an edge section of a recorded signal having a run length longer than a predetermined length, when sampled values corresponding to the recorded signal are sequentially read, the sampled values being extracted from a sequence of sampled values derived by sampling signals read from an optical disc at the timing of the reproduced clock signal. In this event, a level change of the sampled value sequence derived in accordance with reading of the recording pit having a long run length is steeper than a level change of a sampled value sequence derived in accordance with the reading of a recording pit having a short run length. Since the digital signal reproducing apparatus of the present invention corrects the phase of the reproduced clock signal only using the sampled value sequence presenting the steeper level change, a reproduced clock signal with less jitter can be produced.

While in the foregoing embodiment, a long run length is detected based on a sequence of three successive sampled values, the detection of the long run length may also be relied on detection of a sampled value sequence consisting of two successive samples.

FIG. 14 shows another embodiment of the long run length detector circuit 25 which detects a long run length based on a sampled value sequence consisting of two successive samples.

Referring specifically to FIG. 14, a comparator C4 compares each of sampled values "q" sequentially supplied from an A/D convertor 21 with a positive threshold V+, and supplies each of a D-type flip-flop F9 and an AND gate G6 with a logical "1" signal when the sampled value "q" is larger than the positive threshold V+, while supplies each of the D-type flip-flop F9 and the AND gate G6 with a logical "0" signal when the sampled value "q" is smaller than the positive threshold V+. The D-type flip-flop F9 sequentially captures supplied signals at the same timing as a reproduced clock signal "v" and supplies them to an AND gate G5.

A comparator C5 compares each of the sampled values "q" sequentially supplied from the A/D convertor 21 with a negative threshold V−, and supplies each of a D-type flip-flop F10 and the AND gate G5 with a logical "1" signal when the sampled value "q" is smaller than the positive threshold V−, while supplies each of the D-type flip-flop F10 and the AND gate G5 with a logical "0" signal when the sampled value "q" is larger than the positive threshold V−. The D-type flip-flop F10 sequentially captures supplied signals at the same timing as the reproduced clock signal "v" and supplies them to an AND gate G6.

The AND gate G5 outputs a polarity flag signal s1 at logical "1" indicating that a level change of the sampled values "q" presents a decreasing tendency when the signals supplied from the D-type flip-flop F9 and the comparator C5 are both at logical "1", and outputs the polarity flag signal s1 at logical "0" when one of the signals supplied from the D-type flip-flop F9 and the comparator C5 is at logical "0". The AND gate G6 outputs a polarity flag signal s2 at logical "1" indicating that a level change of the sampled values "q" presents an increasing tendency when the signals supplied from the D-type flip-flop F10 and the comparator C4 are both at logical "1", and outputs the polarity flag signal s2 at logical "0" when one of the signals supplied from the D-type flip-flop F10 and the comparator C4 is at logical "0".

In other words, the long run length detector circuit 25 shown in FIG. 14 determines a long run length by detecting that two successive sampled values change from "high" to "low" or "low" to "high" across the positive threshold V+ and the negative threshold V−.

FIG. 15 shows another embodiment of the phase error generator circuit 24 which may be applied when the long run length detector circuit 25 having the internal configuration as shown in FIG. 14 is employed. Referring specifically to FIG. 15, a D-type register DR3, including a plurality of D-type flip-flops arranged in parallel, captures sampled values "q" sequentially supplied thereto from the A/D convertor 21 at the same timing as the reproduced clock signal "v", and supplies them to an adder K1. The adder K1 adds a sampled value supplied from the D-type register DR3 and a sampled value "q" supplied directly from the A/D convertor 21 to produce a sum which is supplied to each of a selector SL3 and a polarity inverting circuit V3. The polarity inverting circuit V3 inverts the polarity of the sum supplied from the adder K1 and supplies the selector SL3 with the polarity inverted sum. More specifically, the polarity inverting circuit V3 converts the sum, when it is a positive value, to a corresponding negative value while converts the sum, when it is a negative value, to a corresponding positive value, and supplies the selector SL3 with the converted value as the polarity inverted sum.

The selector SL3 selectively supplies the sum supplied from the adder K1 to a D-type register DR4 when the polarity flag signal s1 supplied from the long run length detector circuit 25 having the internal configuration as shown in FIG. 14 is at logical "0", and selectively supplies the polarity inverted sum supplied from the polarity inverting circuit V3 to the D-type register DR4 when the polarity flag signal s1 is at logical "1". The D-type register DR4 captures a sampled value supplied from the selector SL3 and outputs same as the phase error signal "u" only when the long run length detecting signal "r" at logical "1" is supplied thereto from the long run length detector circuit 25 having the internal configuration as shown in FIG. 14.

In other words, the phase error generator circuit 24 having the internal configuration as shown in FIG. 15 adds two successive sampled values in a section in which a long run length is detected by the long run length detector circuit 25 of FIG. 14, and uses the sum as the phase error signal "u", regarding that the sum corresponds to an average value of the two sampled values. It goes without saying that the average value is actually calculated by dividing the sum by two and used as the phase error signal "u".

FIG. 16 shows, by way of example, waveforms representing operations performed when the long run length detector circuit 25 configured as shown in FIG. 14 and the phase error generator circuit 24 having the internal configuration as shown in FIG. 15 are applied to the digital signal reproducing apparatus shown in FIG. 5.

In the exemplary operations represented by FIG. 16, the waveforms are produced when the optical pickup 1 in FIG. 5 sequentially traces a recording pit Pt1 corresponding to a recorded signal having a long run length and recording pits Pt2, Pt3 each corresponding to a recorded signal having a short run length recorded on a recording track of the optical disc 3.

As shown in FIG. 16, a sequence of sampled values q2, q3 and a sequence of sampled values q7, q8 derived corresponding to the reading of the long run length recording pit Pt1 present a change from "low" to "high" and a change "high" to "low" across the positive threshold V+ and the negative threshold V−, respectively.

On the other hand, a sequence of sampled values q14–q20 derived corresponding to the reading of the short run length recording pits Pt2, Pt3 does not exceed the positive threshold V+ or the negative threshold V−.

Thus, a polarity flag s2 at logical "1" and a long run length detecting signal "r" are generated in accordance with the two successive sampled values q2, q3 presenting an increasing tendency. Also, a polarity flag signal s1 at logical "1" and the long run length detecting signal "r" are generated in accordance with the two successive sampled values q7, q8. In this event, in response to the first long run length detecting signal "r", the sum of the sampled values q2 and q3 is used as the phase error signal "u". Also, in response to the next long run length detecting signal "r" and the polarity flag signal s1, the sum of the sampled value q7 and q8 with the inverted polarity is used as the phase error signal "u".

While in the digital signal reproducing apparatus as described above, the long run length is detected based on sampled values "q" sequentially supplied from the A/D convertor 21 to the long run length detector circuit 25, the long run length may be detected based on a reproduced digital signal decoded by the decoder 23.

Figure 17:
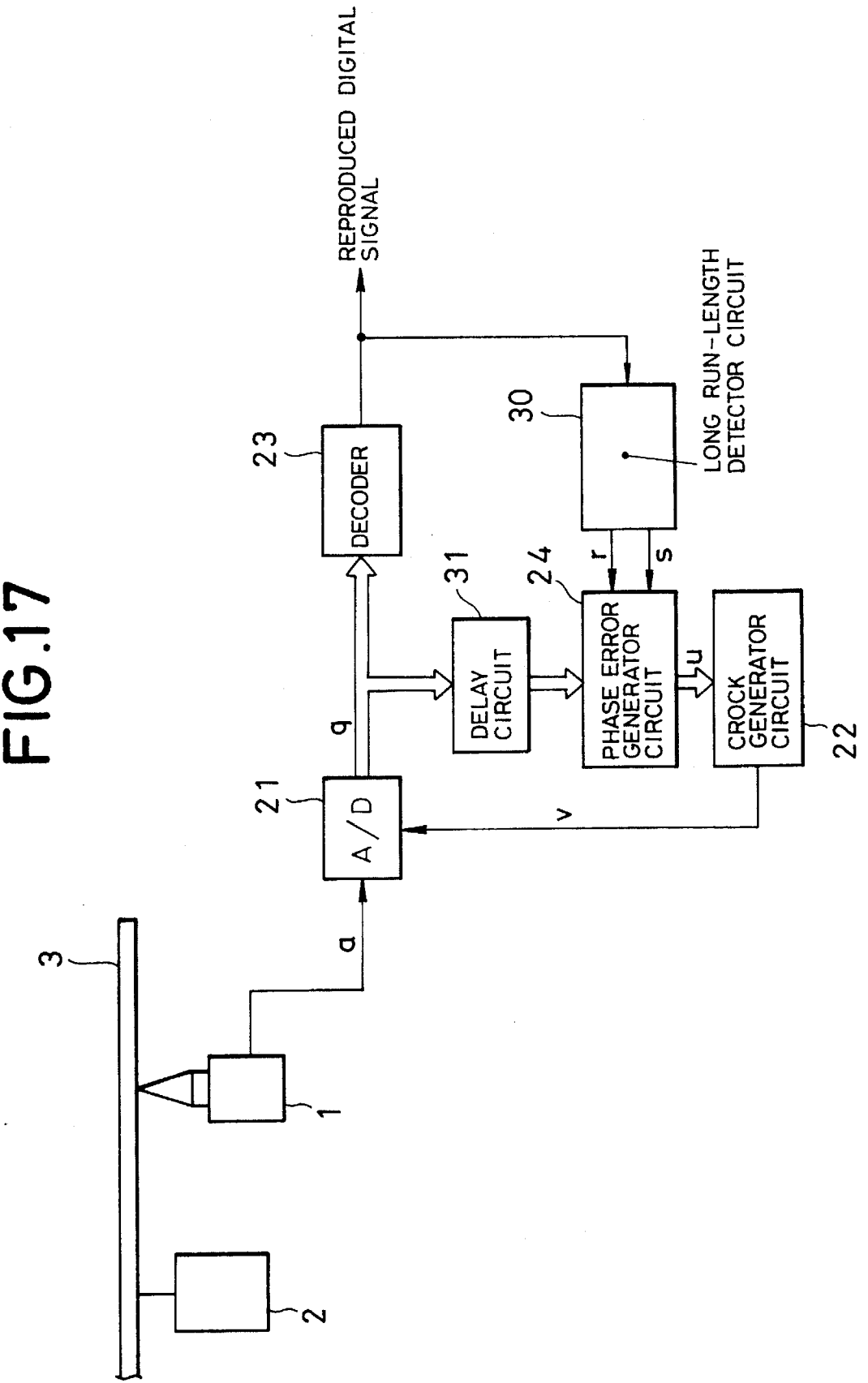
FIG. 17 is a block diagram showing a configuration of a digital signal reproducing apparatus according to another embodiment of the present invention.

FIG. 17 shows the configuration of a digital signal reproducing apparatus according to another embodiment of the present invention which detects a long run length based on a decoded reproduced digital signal.

It is assumed in this embodiment that a signal to be recorded on an optical disc 3 are encoded in conformity with the RLL (1, 7) encoding, and recording pits Pt with its run length limited in a range from 2T to 8T are recorded on a recording track.

Referring specifically to FIG. 17, an optical pickup 1 irradiates the optical disc 3 as an optical recording medium, rotated by a spindle motor 2, with a laser beam. The optical pickup 1 also opto-electrically transforms reflected light from the optical disc 3 to produce a read signal a which is supplied to an A/D convertor 21.

The A/D convertor 21 samples the read signal a at timing of a reproduced clock signal "v" supplied from a clock generator circuit 22, and supplies the sampled values "q" to each of a decoder 23 and a delay circuit 31. The decoder 23, formed of a Viterbi decoder, by way of example, captures the sampled values "q" sequentially supplied thereto from the A/D convertor 21 as a time sequence of successive sampled values, and decodes the sampled values to a reproduced digital signal comprising binary values "1" and "0" in a serial form.

A long run length detector circuit 30 detects whether or not a recorded signal having a run length longer than 3T has been read based on the reproduced digital signal, and supplies a phase error generator circuit 24 with a long run length detecting signal "r" corresponding to the detection. The long run length detector circuit 30 further supplies the phase error generator circuit 24 with a polarity flag signal "s" corresponding to an edge polarity of the reproduced digital signal during the detection of a long run length.

Figure 18:
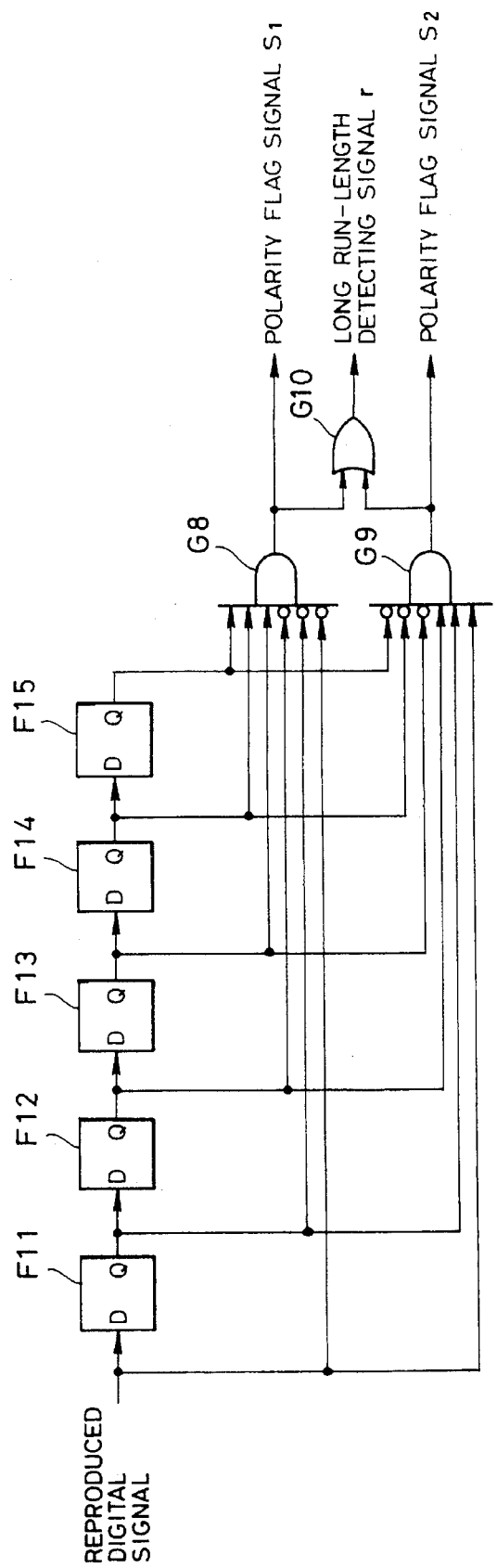
FIG. 18 is a schematic circuit diagram showing an internal configuration of a long run length detector circuit 30.

FIG. 18 shows an example of an internal configuration of the long run length detector circuit 30.

Referring specifically to FIG. 18, a serial reproduced digital signal comprising binary values "1" and "0" decoded by the decoder 23 is sequentially supplied to a shift register composed of D-type flip-flops F11 to F15. The shift register shifts the reproduced digital signal in the order of F11, F12, F13, F14 and F15 at the same timing as the reproduced clock signal "v". An AND gate G8 outputs a polarity flag signal s1 at logical "1" only when the reproduced digital signal and outputs of the D-type flip-flops F11, F12, F13, F14, F15 are at logical "0, 0, 0, 1, 1, 1". An AND gate G9 outputs a polarity flag signal s2 at logical "1" only when the reproduced digital signal and the outputs of the D-type flip-flops F11, F12, F13, F14, F15 are at logical "1, 1, 1, 0, 0, 0". An OR gate G10 outputs a long run length detecting signal "r" at logical "1" when one of the polarity flag signal s1 and the polarity flag signal s2 is at logical "1".

It will be understood from the foregoing that the long run length detector circuit 30 determines that a recorded signal having a run length longer than 3T has been read when detecting a sequence of reproduced digital signal bits being at "0, 0, 0, 1, 1, 1" or "1, 1, 1, 0, 0, 0" and outputs the long run length detecting signal "r" at logical "1".

Referring back to FIG. 17, the delay circuit 31, composed, for example, of a shift register, a FIFO (first-in, first-out) buffer, or the like, delays sampled values "q" sequentially supplied thereto from the A/D convertor 21 for a predetermined time, and then supplies the delayed sampled values "q" to the phase error generator circuit 24. In this event, a delay time provided by the delay circuit 31 corresponds to a sum of a time spent for the decoding performed by the decoder 23 and a time spent for the detection performed by the long run length detector circuit 30.

The phase error generator circuit 24 extracts a sampled value received during the detection of a long run length, indicated by the long run length detecting signal "r", from sampled values "q" sequentially supplied thereto after delayed by the delay circuit 31. In this event, the phase error generator circuit 24 supplies the clock generator circuit 22 with the sampled value extracted as mentioned above as the phase error signal "u" when it is supplied with the polarity flag signal "s" indicating that a level change of the sampled values "q" during the detection of the long run length presents an increasing tendency, and supplies the clock generator circuit 22 with the sampled value extracted as mentioned above, with the inverted polarity, as the phase error signal "u" when it is supplied with the polarity flag signal "s" indicating that the level change of the sampled values "q" presents a decreasing tendency. The clock generator circuit 22 generates a clock signal having a phase corresponding to the phase error signal "u", and supplies same to the A/D convertor 21 as the reproduced clock signal "v".

As described above, the digital signal reproducing apparatus of this embodiment relies on a bit signal sequence of a reproduced digital signal decoded on the basis of a sampled value sequence derived by sampling a read signal at the timing of a reproduced clock signal, detects an edge section of a recorded signal, in which sampled values corresponding to the recorded signal having a run length longer than a predetermined length are sequentially read, and corrects the phase of the reproduced clock signal based on the sampled values in this edge section. In this event, a level change of a sampled value sequence derived in accordance with the reading of a long run length recorded signal is steeper than a level change of a sampled value sequence derived in accordance with the reading of a short run length recorded signal. Since the digital signal reproducing apparatus of this embodiment corrects the phase of the reproduced clock signal only using the sampled value sequence presenting a steeper level change, the reproduced clock signal with less jitter can be generated.

It should be noted that while in the foregoing embodiment, the long run length is defined to be a run length equal to or longer than 3T, the long run length may be detected as a run length longer than 3T, for example, equal to or longer than 4T.

Also, while in the foregoing embodiments, a modulation scheme for a signal to be recorded on the optical disc 3 is the RLL (1, 7) encoding, the present invention may also be applied to an EFM modulation scheme which is employed in RLL (2, 7) encoding, CD (compact disc), and so on. For example, if the modulation scheme for the signal to be recorded on the optical disc 3 is the EFM modulation, the run length is limited in a range from 3T to 11T. Thus, in this case, the phase of a reproduced clock signal is corrected based on read information corresponding to a recorded signal having a run length equal to or longer than 4T, excluding 3T.

Further, in the foregoing embodiments, a long run length is detected based on a level change presented by a sequence of two or three successive sampled values sequentially supplied from the A/D convertor 21. Alternatively, the long run length may be detected based on a level change presented by a sequence of four or five successive sampled values.

Furthermore, in the foregoing embodiment, the phase error signal "u" is generated from one sampled value captured during the detection of a long run length or an average value of two sampled values captured during the detection of a long run length. Instead, a weighted average value of three or four samples may also be used for the same purpose.

As described above, the digital signal reproducing apparatus according to the present invention is configured to correct the phase of the reproduced clock signal based on a sampled value derived at an edge section of a recorded signal which occurs when recording signal portions having a run length longer than a predetermined length are consecutively read, among sample value series obtained by sampling the read signal, which is read-out from the optical disk, at the timing of the reproduced clock signal.

In other words, according to the digital signal reproducing apparatus described above, the phase of the reproduced clock signal is corrected based on a sampled value in the edge section of the recorded signal, in which the level change is relatively steep.

Thus, since the present invention enables a reproduced clock signal to be generated with less jitter even if recording information is recorded on an optical disc in a high density, reproduced digital signals with a lower error ratio can be advantageously accomplished.

What is claimed is:

1. A digital signal reproducing apparatus for reproducing a digital signal based on a read signal read from a recording medium on which signals with limited run lengths are recorded, comprising:

an A/D convertor for sequentially sampling said read signal at timing of a reproduced clock signal to convert said read signal to sampled values;

decoding means for decoding said reproduced digital signal based on said sampled values;

long run length detecting means for detecting an edge section of said recorded signal in a section in which sampled values corresponding to a recorded signal having said run length longer than a predetermined length are successively read, based on said sampled values;

phase error generating means for extracting a sampled value derived in said edge section from said sampled values and generating a phase error signal corresponding to the extracted sampled value; and clock generating means for generating a clock signal having a phase which changes based on said phase error signal as said reproduced clock signal.

2. A digital signal reproducing apparatus according to claim 1, wherein said long run length detecting means detects a section in which said sampled values continuously increase or continuously decrease over a predetermined time period.

3. A digital signal reproducing apparatus according to claim 1, wherein said long run length detecting means detects a section in which said sampled value changes beyond a predetermined threshold.

4. A digital signal reproducing apparatus according to claim 1, wherein said predetermined length is the shortest run length in said recorded signal.

5. A digital signal reproducing apparatus according to claim 1, wherein said phase error generating means generates a signal corresponding to a sampled value at a middle point of said edge section as said phase error signal.

6. A digital signal reproducing apparatus according to claim 1, wherein said phase error detecting means generates a signal corresponding to an average value of sampled values at points previous to and subsequent to a middle point of said edge section as said phase error signal.

7. A digital signal reproducing apparatus for reproducing a digital signal based on a read signal read from a recording medium on which signals with limited run lengths are recorded, comprising:

an A/D convertor for sequentially sampling said read signal at timing of a reproduced clock signal to convert said read signal to sampled values;

decoding means for decoding said reproduced digital signal based on said sampled values;

long run length detecting means for detecting an edge section of said recorded signal in a section in which sampled values corresponding to a recorded signal having said run length longer than a predetermined length are successively read, based on said digital signal;

phase error generating means for extracting a sampled value derived in said edge section from said sampled values and generating a phase error signal corresponding to the extracted sampled value; and clock generating means for generating a clock signal having a phase which changes based on said phase error signal as said reproduced clock signal.

8. A digital signal reproducing apparatus according to claim 7, wherein said predetermined length is the shortest run length in said recorded signal.

9. A digital signal reproducing apparatus according to claim 7, wherein said phase error generating means generates a signal corresponding to a sampled value at a middle point of said edge section as said phase error signal.

10. A digital signal reproducing apparatus according to claim 7, wherein said phase error detecting means generates a signal corresponding to an average value of sampled values at points previous to and subsequent to a middle point of said edge section as said phase error signal.

\* \* \* \* \*